United States Patent [19]

Godot et al.

[11] 4,090,781
[45] May 23, 1978

[54] MIRROR ORIENTING DEVICE FOR A LASER LEVELLING INSTRUMENT

[75] Inventors: Jean Marie Godot, Brunoy; Gerard Lafargue, Lile St. Denis, both of France

[73] Assignee: Essilor International Compagnie Generale d'Optique, Joinville le Pont, France

[21] Appl. No.: 755,573

[22] Filed: Dec. 30, 1976

[30] Foreign Application Priority Data

Feb. 16, 1976 France .................................. 76 4142

[51] Int. Cl.² ............................................ G02B 25/00
[52] U.S. Cl. ..................................... 350/285; 350/25; 350/255; 356/172
[58] Field of Search .................. 350/285, 156, 25, 262, 350/301, 302; 33/286, 290, 291, DIG. 21; D6/232; D10/66; 356/172, 255; 248/484, 486

[56] References Cited

U.S. PATENT DOCUMENTS

| | | | |
|---|---|---|---|
| 3,531,206 | 9/1970 | Bjerhammer | 350/25 |
| 3,892,475 | 7/1975 | Bardocz | 350/285 |
| 3,997,267 | 12/1976 | Met | 356/255 |
| 3,998,554 | 12/1976 | Burch et al. | 356/172 |

*Primary Examiner*—John K. Corbin
*Assistant Examiner*—B. W. de los Reyes
*Attorney, Agent, or Firm*—Burgess, Ryan and Wayne

[57] ABSTRACT

A mirror-orienting device for a laser levelling instrument utilizes an optical deflection system, a mirror which rotates about a fixed axis in the same plane as the mirror, a mirror lever fixed to the mirror at one end, a component for fine adjustment of rotation of the mirror, combined with a linear measurement indicator, which includes a measuring contact that moves axially. This allows the mirror to be oriented accurately, in relation to a reference direction, for example a horizontal or a vertical direction.

6 Claims, 5 Drawing Figures

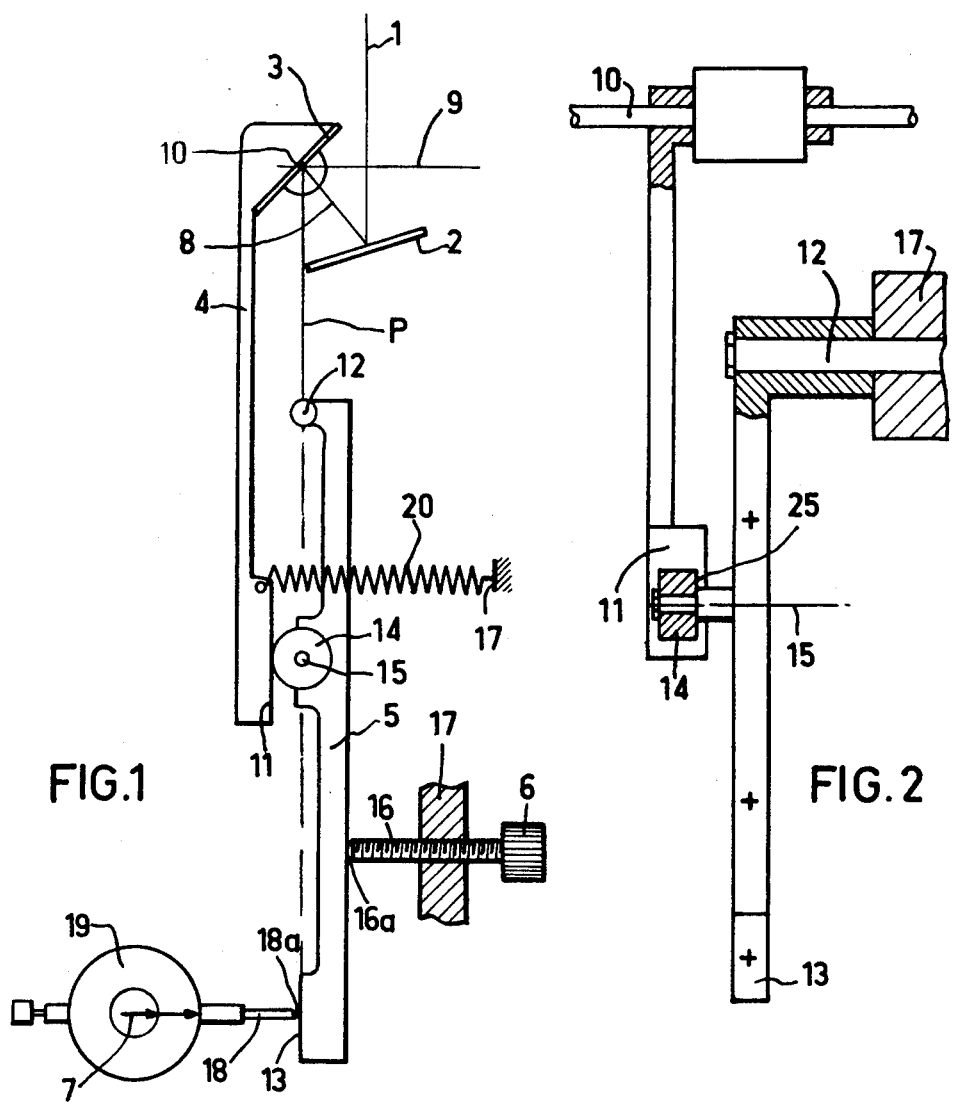
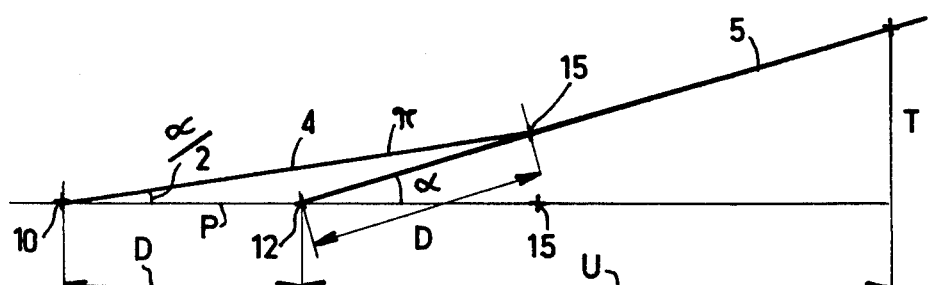

MIRROR ORIENTING DEVICE FOR A LASER LEVELLING INSTRUMENT

This invention concerns a device to orient a mirror precisely, in relation to a reference direction, for example a horizontal or a vertical direction.

More specifically, the invention concerns a device that can be used in conjunction with a laser levelling instrument, allowing the laser beam emerging from the instrument to be oriented precisely, in relation to a reference direction.

When a mirror is rotated through an angle $\alpha$, the light beam deflected by it undergoes a rotation of twice this angle, i.e. $2\alpha$. During building work and levelling operations, surveyors use as a basic datum the gradient, in other words the tangent if the angle formed between the reference light beam and the horizontal.

Since the tangent of angle $\alpha$ is not equal to half the tangent of the double angle $2\alpha$, and since the angle of rotation of the light beam deflected by the mirror is equal to twice the angle of rotation of the mirror, it is necessary to have a measuring device with linear indication, to show the value of the tangent of the angle $2\alpha$, and which co-operates with the mechanical system responsible for totating the mirror through the angle $\alpha$.

A device to perform this function has already been proposed in French Pat. No. 2,154,554. It comprises a mirror fixed to a lever, the axis of which passes through the axis of rotation of the mirror, and which can be moved about this rotation axis, by means of a fine-adjustment device. the length of the lever is variable, and the point at the other end from the mirror moves along a circular trajectory and co-operates with a linear measurement indicator.

However, this device cannot be used to rotate the mirror through an angle $\alpha$, when the value of the tangent of the double angle $2\alpha$ is displayed on the linear indicator, after operation of the fine-adjustment device.

This can cause serious errors in measurement when the distance between the instrument and the point aimed at is long, as is usually the case with levelling operations.

The device described in this invention overcomes this major drawback, and is capable of making the mirror rotate by an exact angle $\alpha$, without any margin of approximation.

The device described in this invention consists of simple, reliable, inexpensive mechanical parts, and it is capable of deflecting an emergent laser beam by an angle equal to the angle for which the tangent has been displayed on the linear measurement-display device co-operating with the mechanical mirror-rotating system.

This new device comprises an optical deflecting system, a mirror which rotates about a fixed axis in the same plane as the mirror, a lever fixed to the mirror at one end, and a device for fine adjustment of rotation of the mirror, combined with a linear measurement indicator, which includes an axially movable measuring contact, said orientating device further comprising a control lever which rotates about a second fixed axis parallel to the axis of rotation of the mirror, and which defines between its ends a cylindrical surface with an axis of revolution parallel to the two fixed axes, and a flat surface which co-operates with the measuring contact and which is parallel to the axis of rotation of the control lever, while the other end of the mirror lever from the mirror contains a flat surface parallel to the plane defined by the axis of rotation of the mirror and the axis of revolution of the cylindrical surface, and facing this cylindrical surface, with a spring device fitted to this mirror lever in order to keep the flat surface area and the cylindrical surface in mutual contact, the fine-adjustment device being designed to act on the control lever, the axis of rotation of which is equidistant from the axis of rotation of the mirror and the axis of revolution of the cylindrical surface.

The invention is described in detail below, with reference to the accompanying drawings in which:

FIG. 1 is partly an elevation and partly a vertical cross-section, showing one embodiment of the invention.

FIG. 2 is a second view of this first embodiment, also partly in elevation and partly in vertical cross-section.

FIGS. 4 and 5 illustrate the basic principles of this invention.

Figure 3:
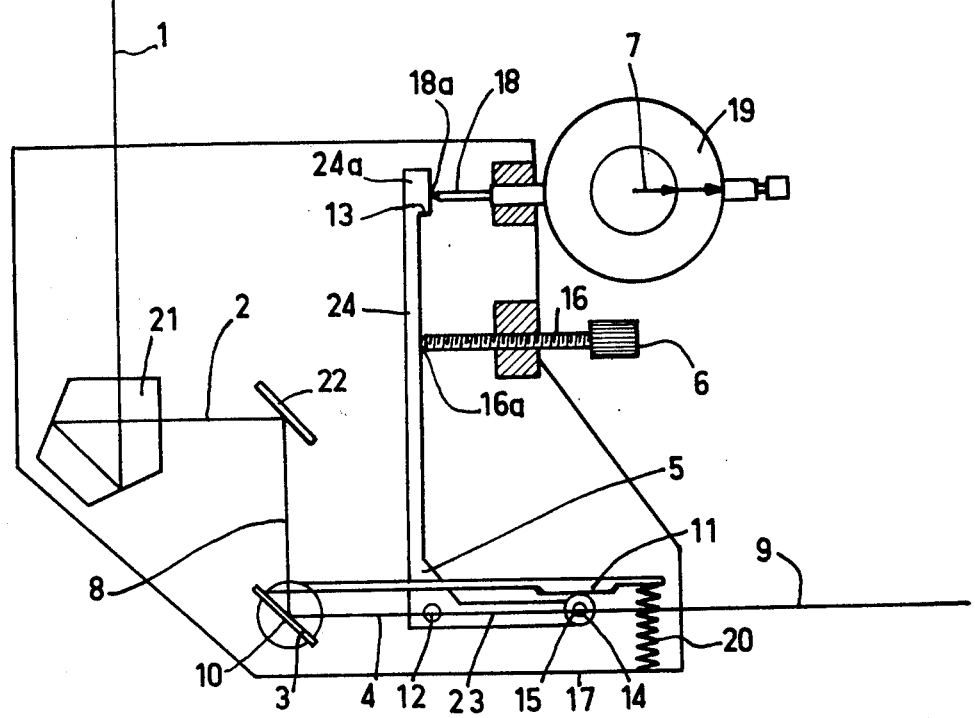
FIG. 3 is a cross-sectional view of a second embodiment of the invention.

In the embodiments chosen and illustrated in FIGS. 1 to 3, this device comprises a fixed optical deflection system 2, a movable mirror 3, a mirror lever 4 fixed to the mirror 3 and rotatable, a control lever 5, also rotatable, and which co-operates with a fine-adjustment device 6 and a linear measurement-indicator 7.

FIG. 1 shows the incident laser beam 1, which in this case is vertical, the beam 8 reflected by the optical system 2, and the emergent laser beam 9, reflected by the movable mirror 3.

The same references are used for identical sub-assemblies and components in both embodiments.

In the first embodiment illustrated in FIGS. 1 and 2, the mirror lever 4 fixed to the mirror 3 rotates on a fixed axis 10 located in the plane of the mirror 3, and contains a plane bearing surface 11, parallel to the axis 10, at the end remote from the mirror.

The control lever 5 rotates on a fixed axis 12, parallel to axis 10 and located at a distance D from it.

The end of control lever 5 remote from the axis 12 and surface 11 contains a planar bearing surface 13, parallel to axis 12. A cylindrical wheel 14, which can revolve about its axis 15 and which has a diameter $d$, is mounted on an axle 25, fixed to the lever 5. The axis of revolution 15 is parallel to axes 10 and 12, and is at a distance D from axis 12.

The fine-adjustment device 6 comprises a micrometric screw 16, the end 16a of which, opposite the actuating end, rests on the side of the control lever 5, which is opposite the planar supporting area 13. A spring 20, one end of which is attached to the cover 17 of the device and the other end of which is attached to the lever 4 near the end 4a thereof, is designed to keep the bearing surface 11 in permanent contact with the wheel 14, and consequently the lever 5 in contact with the end 16a of the screw 16. The linear measurement indicator 7 comprises a measuring contact 18, which moves axially, and a dial 19, on which the amount of displacement of the contact 18 in relation to its reference position is displayed.

The end 18a of contact 18 co-operates with the planar surface 13 on control lever 5.

In the second embodiment, illustrated in FIG. 3, the fixed optical deflection system 2 comprises a pentagonal prism 21 and mirror 22. The control lever 5 has two arms 23 and 24, substantially perpendicular to each other. The cylindrical wheel 14, with a diameter $d$, and which revolves on its axis 15, is fixed to the free end of the arm 23, and co-operates with the planar surface 11 defined on mirror lever 4.

A planar bearing surface 13, co-operating with the contact 18 of the measurement indicator, is provided at the end 24a of arm 24.

The end 16a of the micrometric screw 16 rests on control lever arm 24, between the surface 13 and axis 12.

A spring 20, one end of which is fixed to the cover 17 of the device, the other end being fixed to the arm 23 of the lever 5, is designed to keep the surface 11 in permanent contact with the wheel 14, and consequently the arm 24 in contact with the end 16a of screw 16.

In both embodiments illustrated here, the planar bearing surface 11 on the lever mirror 4 is so positioned that, regardless of the position of the lever, the surface 11 is parallel to the plane II defined by the parallel axes 10 and 15, and situated at a distance d/2 from this plane.

In FIGS. 1 to 3, the axis of revolution 15 of the cylindrical wheel 14 is contained in the plane P defined by axes 10 and 12.

This particular position of the axis 15 has been chosen to make illustration of the device easier, but it is not essential for proper operation of the device, and it can be in any position in relation to the plane II, when the emergent beam 9 is in its reference position: this will be explained below in connection with FIG. 5.

One of the essential conditions for proper operation of the device concerns the position of the linear measurement indicator 7 in relation to control lever 5, when this lever is in its reference position. In order to measure accurately the tangent of the angle of rotation α of the control lever 5, the contact 18 must move perpendicularly to the plane defined by the surface 13 in the reference position.

Consequently, when the parts of the device are in their reference position, the contact 18 must be perpendicular to the planar bearing surface 13.

The distance U between the end 18a of the contact 18 in its reference position and the axis 12 is a constant feature of the device.

When the control lever 5 rotates through an angle α from its reference position, the end 18a of the contact 18 travels a distance T.

The tangent of the angle α is equal to the ratio T/U, T and U being expressed in millimeters, for example. A predetermined value can be attributed to U, for example 100 mm. Consequently, tangent α will be equal to 100 T, and this value can be read directly from the dial 19, using suitable graduations.

Functioning of the device will now be described, with reference to FIGS. 1 to 5. Let it be assumed that the emergent laser beam 9 is to be deflected by an angle α from its reference direction, for example the horizontal direction, and that the value of the tangent of this angle α is known.

The micrometric screw 16 is turned in the required direction. This causes the control lever 5 to rotate on its axis 12, and the reading on the dial 19 of the measurement indicator 7 is checked. When the value reaches tangent α, the control lever 5 will have turned by the angle α.

Simultaneously, the wheel 14 causes the mirror lever 4 and consequently the mirror 3 to rotate by an angle α/2. As can be seen in FIG. 4, the triangle formed by the intersection of axes 10, 12 and 15 with a plane perpendicular to them is an isosceles triangle, since the distance between axes 10 and 12 and axes 12 and 15 are equal.

Consequently, when the control lever 5 rotates through the angle α, the mirror lever 4 and mirror 3 rotate through an angle α/2. The emergent laser beam 9 is therefore deflected from its reference direction by the angle d.

In FIG. 4, planes P and II coincide when all parts are in their reference positions.

Figure 5:
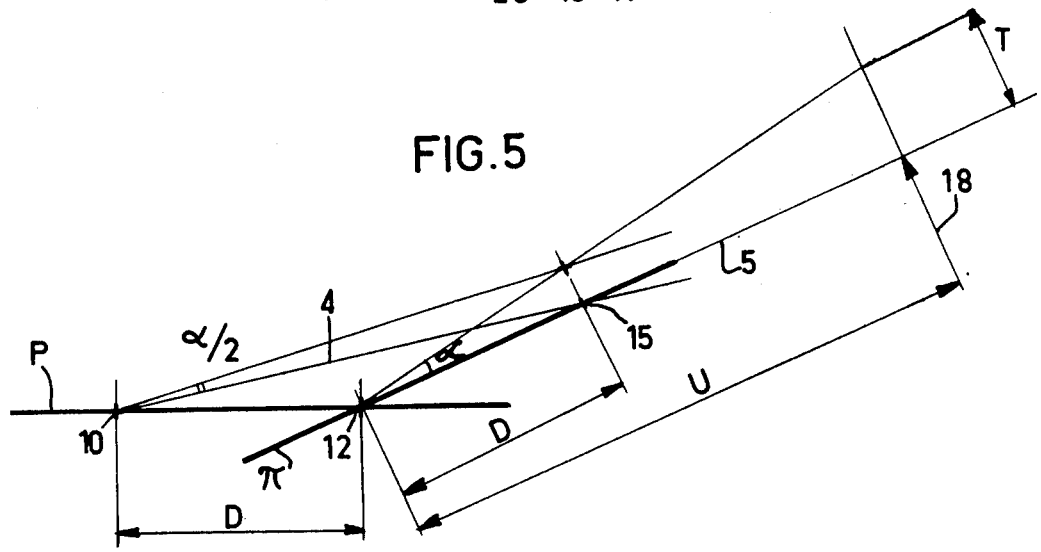

In FIG. 5, plane II is separate from plane P when all parts are in their reference positions. For this position the contact 18 is, as has already been seen, perpendicular to the plane II.

If the control lever 5 rotates by the angle α, the mirror lever 4 will rotate by the angle α/2, the property of the isosceles triangle defined above remaining valid.

The embodiments illustrated in FIGS. 1 to 3 show a cylindrical wheel 14 revolving about its axis 15. Alternatively, a fixed cylinder may be used, or a cylindrical surface of revolution, with an axis of revolution 15, the distance between the surface and this axis being equal to d/2.

In another embodiment of the invention, the device 6 for fine adjustment of rotation of the mirror and the linear measurement indicator 7 are combined in a single adjustment and measuring device.

Such an adjustment and measuring device could consist of a micrometric screw comprising a vernier, graduated from 0 to 100, for example, and a revolution-counter, combined in a way known in the prior art.

Such a device could also consist of a micrometric screw combined, in a way known in the previous art, with a resistive or capacitive movementmeasuring system, the signal supplied by this measuring system being processed electronically to supply the tangent of the angle of rotation of the laser beam, preferably displayed in digital form.

The embodiments described above are naturally given merely as examples, and the invention is in no way confined to them: many different forms can be implemented, without any departure from the spirit of this invention.

What is claimed is:

1. A mirror-orienting device for a laser levelling instrument, said device comprising an optical deflecting system, a mirror mounted for rotation about a first fixed axis in the plane thereof, a mirror lever fixed to the mirror at one end thereof, a device for fine adjustment of rotational position of the mirror, a linear measurement indicator including an axially movable measuring contact, a control lever mounted for rotation about a second fixed axis parallel to the first axis, said control lever having between its ends a mirror lever engaging surface and a first flat surface remote from said second axis and said mirror lever engaging surface, said flat surface engaging with the measuring contact and being disposed parallel to the axis of rotation of the control lever, the end of the mirror lever remote from the mirror having a second flat surface parallel to the plane defined by said first and second axes, with a spring for urging said second flat surface of said mirror lever and said mirror lever engaging surface into mutual contact, the fine-adjustment device being mechanically coupled to one of said levers, said second axis being equidistant from said first axis and the region of contact of said mirror lever engaging surface with said second flat surface.

2. A device as defined in claim 1, in which the axially-moving measuring contact is perpendicular to the first flat surface with which said contact co-operates, when said region of contact is adjacent the plane of said first and second axes.

3. A device as defined in claim 2, wherein said levers and said measuring contact each have a reference position, and the distance between the point of contact of the measuring contact on the first flat surface with which said contact co-operates and the second axis, measured in a direction perpendicular to said second axis, has a predetermined value of 100 millimeters when said levers and said measuring contact are in their respective reference positions.

4. A device as defined in claim 1, in which the distance between the point of contact of the measuring contact on the first flat surface with which said contact co-operates, and the second axis, measured in a direction perpendicular to said second axis, has a predetermined value of 100 millimeters, when said region of contact is adjacent the plane of said first and second axes.

5. A device as defined in claim 1, wherein said mirror lever engaging surface comprises a cylindrical element.

6. A device as defined in claim 5, wherein said element is rotatable about an axis parallel to said first and second axes.

* * * * *

UNITED STATES PATENT OFFICE
CERTIFICATE OF CORRECTION

Patent No. 4,090,781  Dated May 23, 1978

Inventor(s) Jean Marie Godot, et al

It is certified that error appears in the above-identified patent and that said Letters Patent are hereby corrected as shown below:

In the Title Page, line 2 of the inventor information: "Lile" should be --L'ile--.

Column 1, line 17: "if" should be --of--.

Column 1, line 26: "totating" should be --rotating--.

Column 1, line 32: "device. the" should be --device. The--.

Column 3, lines 18 and 26: "II" should be --$\pi$--.

Column 4, line 7: "angled" should be --angle $\alpha$ --.

Column 4, lines 8, 10 and 13: "II" should be --$\pi$--.

Column 4, line 33: "movementmeasuring" should be --movement-measuring--.

Signed and Sealed this

Fifteenth Day of May 1979

[SEAL]

Attest:

RUTH C. MASON
Attesting Officer

DONALD W. BANNER
Commissioner of Patents and Trademarks